(12) United States Patent
Yoon et al.

(10) Patent No.: US 11,180,597 B2
(45) Date of Patent: Nov. 23, 2021

(54) POLYMER COMPOSITION

(71) Applicant: SHANJIN OPTOELECTRONICS (SUZHOU) CO., LTD., Jiangsu (CN)

(72) Inventors: Jeong Ae Yoon, Daejeon (KR); Su Jeong Kim, Daejeon (KR); Sung Soo Yoon, Daejeon (KR); Han Na Chi, Daejeon (KR); Sang Ha Son, Daejeon (KR); Su Jee Kwon, Daejeon (KR); Chang Hwan Ju, Daejeon (KR); Geun Ho Park, Daejeon (KR); Kyung Oh Kim, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 18 days.

(21) Appl. No.: 16/305,296

(22) PCT Filed: Sep. 7, 2017

(86) PCT No.: PCT/KR2017/009813
§ 371 (c)(1),
(2) Date: Nov. 28, 2018

(87) PCT Pub. No.: WO2018/048216
PCT Pub. Date: Mar. 15, 2018

(65) Prior Publication Data
US 2020/0010600 A1 Jan. 9, 2020

(30) Foreign Application Priority Data
Sep. 8, 2016 (KR) .................... 10-2016-0115609

(51) Int. Cl.
*C09J 7/38* (2018.01)
*C09J 153/00* (2006.01)
(Continued)

(52) U.S. Cl.
CPC ............ *C08F 299/024* (2013.01); *C09J 7/20* (2018.01); *C09J 7/385* (2018.01); *C09J 7/387* (2018.01);
(Continued)

(58) Field of Classification Search
None
See application file for complete search history.

(56) References Cited

U.S. PATENT DOCUMENTS 6,288,173 B1 9/2001 Schimmel et al.
6,432,475 B1 8/2002 Yamamoto et al.
(Continued)

FOREIGN PATENT DOCUMENTS

CN        1328577 A    12/2001
CN    101784574 A     7/2010
(Continued)

OTHER PUBLICATIONS

Search report from International Application No. PCT/KR2017/009813, dated Dec. 18, 2017.
(Continued)

*Primary Examiner* — Frank D Ducheneaux
(74) *Attorney, Agent, or Firm* — Schmeiser, Olsen & Watts, LLP

(57) ABSTRACT

The present invention relates to a polymer composition, an optical laminate and a display device, and can provide a polymer composition capable of forming a pressure-sensitive adhesive layer which has excellent workability, durability and dimensional stability and is capable of effectively alleviating the bending phenomenon of the display, through a polymer capable of forming a physically cross-linked structure together with a chemically cross-linked structure. In addition, the present invention can provide an optical
(Continued)

laminate comprising a cross-linked product of the polymer composition and a display device comprising the same.

18 Claims, 1 Drawing Sheet

(51) Int. Cl.
*C09J 133/08* (2006.01)
*C09J 133/10* (2006.01)
*C08F 299/02* (2006.01)
*C09J 7/20* (2018.01)
*C09J 133/06* (2006.01)

(52) U.S. Cl.
CPC ......... *C09J 133/066* (2013.01); *C09J 133/08* (2013.01); *C09J 133/10* (2013.01); *C09J 153/005* (2013.01); *C09J 2203/318* (2013.01); *C09J 2433/00* (2013.01); *C09J 2453/00* (2013.01)

(56) References Cited

U.S. PATENT DOCUMENTS

| | | | |
|---|---|---|---|
| 6,492,468 B1 | 12/2002 | Chen et al. | |
| 2003/0096075 A1* | 5/2003 | Dollase | C09J 153/00 428/40.1 |
| 2004/0142193 A1* | 7/2004 | Husemann | C09J 153/00 428/500 |
| 2006/0154098 A1* | 7/2006 | Dollase | C09J 7/387 428/522 |
| 2009/0208739 A1* | 8/2009 | Husemann | C08F 293/005 428/354 |
| 2009/0275705 A1* | 11/2009 | Fujita | C09J 153/00 525/342 |
| 2011/0034623 A1 | 2/2011 | Balk et al. | |
| 2011/0135921 A1 | 6/2011 | Tse et al. | |
| 2012/0029139 A1 | 2/2012 | Dufaure et al. | |
| 2014/0066539 A1* | 3/2014 | Tobing | C09J 153/00 522/46 |
| 2014/0375934 A1 | 12/2014 | Kim et al. | |
| 2015/0010743 A1 | 1/2015 | Katare et al. | |
| 2016/0208039 A1* | 7/2016 | Yoon | C08F 220/18 |
| 2017/0183543 A1* | 6/2017 | Nagata | B32B 27/00 |

FOREIGN PATENT DOCUMENTS

| | | |
|---|---|---|
| CN | 102015952 A | 4/2011 |
| EP | 2578655 A1 | 4/2013 |
| JP | 2001115124 A | 4/2001 |
| JP | 2002531598 A | 9/2002 |
| JP | 2010106230 A | 5/2010 |
| JP | 2010536969 A | 12/2010 |
| JP | 2016525584 A | 8/2016 |
| KR | 20110008028 A | 1/2011 |
| KR | 101023839 B1 | 3/2011 |
| KR | 101171976 B1 | 8/2012 |
| KR | 101171977 B1 | 8/2012 |
| KR | 20140119167 A | 10/2014 |
| KR | 20140131873 A | 11/2014 |
| TW | 200948918 A | 12/2009 |
| WO | 2009111433 A1 | 9/2009 |
| WO | WO-2015030550 A1 * | 3/2015 ............ C08F 220/18 |
| WO | 201733871 A1 | 3/2017 |

OTHER PUBLICATIONS

Search report from Office Action dated Apr. 11, 2018 from Taiwan Application No. 106130731.
Extended European Search Report including Written Opinion for Application No. EP17849100.7 dated May 9, 2019.
Polymer Alloy, "Section III, Microphase Separation Structure of Block Copolymers," edited by Pu Feng, Tongji University Press, published Dec. 31, 1997; p. 71.
Search Report from First Chinese Office Action for Application No. 201780016605.1 dated Apr. 7, 2020; 2 pages.

* cited by examiner

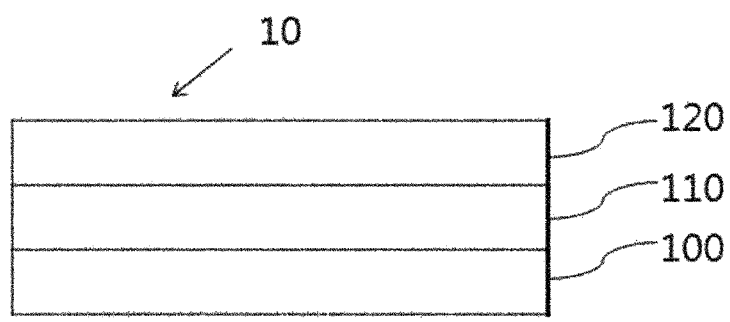

POLYMER COMPOSITION

CROSS-REFERENCE TO RELATED APPLICATIONS

The present application is a national phase entry under 35 U.S.C. § 371 of International Application No. PCT/KR2017/009813, filed Sep. 7, 2017, which claims priority from Korean Patent Application No. 10-2016-0115609, filed on Sep. 8, 2016, the disclosures of which are incorporated herein by reference.

TECHNICAL FIELD

The present invention relates to a polymer composition, an optical laminate and a display device.

The polymer composition is used in various fields, and is typically used as a pressure-sensitive adhesive. One of the fields where the pressure-sensitive adhesive is used may include a liquid crystal display device (hereinafter, referred to as "LCD device"). The LCD device typically comprises a liquid crystal panel containing a liquid crystal component injected between two transparent substrates, and an optical film. The optical film includes a polarizing film, a retardation film or a brightness enhancement film, and the like. In many cases, a pressure-sensitive adhesive for an optical film is often used to laminate optical films or attach an optical film to an adherend such as a liquid crystal panel. As the pressure-sensitive adhesive, there are those using an acrylic polymer, rubber, a urethane resin, a silicone resin or ethylene vinyl acetate (EVA) resin, and the like. As the pressure-sensitive adhesive for an optical film, particularly, a polarizing plate, a pressure-sensitive adhesive containing an acrylic copolymer having excellent transparency and good resistance to oxidation or yellowing is generally used.

The main physical properties required in the pressure-sensitive adhesive composition for an optical film include cohesive force, adhesive force, re-workability, low light leakage property and stress relaxation property, and the like. In Patent Documents 1 to 3, pressure-sensitive adhesive compositions for achieving the above properties have been proposed.

PRIOR ART DOCUMENTS

Patent Documents

Patent Document 1: Korean Patent No. 1023839
Patent Document 2: Korean Patent No. 1171976
Patent Document 3: Korean Patent No. 1171977

DISCLOSURE

Technical Problem

The present invention provides a polymer composition, an optical laminate, a polarizing plate and a display device.

Technical Solution

The polymer composition of the present invention comprises a block copolymer comprising a first block and a second block. In the present invention, the polymer composition may refer to a composition comprising components that can simultaneously realize chemical cross-linking generally known and physically cross-linked structure by a physical method. The polymer composition may be, for example, a polymer composition capable of forming a pressure-sensitive adhesive composition.

The block copolymer may be, for example, a block copolymer comprising a first block, which is in a form of a triblock copolymer, and a second block, where the second block is bonded to both ends of the first block, respectively. In the present invention, the fact that the second block is bonded to both ends of the first block means that the second block is connected by covalent bonds through both ends of the chain of the first block.

The block copolymer may comprise, for example, a first block having a glass transition temperature of 20° C. or higher and a second block having a glass transition temperature of 10° C. or lower. In this specification, the "glass transition temperature of a given block" may mean a glass transition temperature measured from a polymer formed of only the monomers contained in the block. In one example, the glass transition temperature of the first block may be 20° C. or higher, 40° C. or higher, or 60° C. or higher. Also, the upper limit of the glass transition temperature of the first block is not particularly limited, but may be, for example, 200° C. or lower, 180° C. or lower, or 160° C. or lower. In one example, the glass transition temperature of the second block may be 10° C. or lower, 0° C. or lower, or −10° C. or lower. The lower limit of the glass transition temperature of the second block is not particularly limited, but may be, for example, −80° C. or higher, −70° C. or higher, or −60° C. or higher. By controlling the glass transition temperatures of the first block and the second block within the above ranges, the first block and the second block have a micro phase separated structure to be described below, and form physical cross-linking capable of forming a structure including a stress relaxation point. As described above, the block copolymer may form physical cross-linking, thereby providing a cross-linkable composition capable of forming a pressure-sensitive adhesive layer having excellent adhesive reliability, re-workability, and cutting property.

In the present invention, for example, the first block may be in the form of a triblock copolymer. The triblock copolymer comprises, for example, A blocks and a B block, where the A blocks may be bonded to both ends of the B block, respectively. In the present invention, the fact that the A blocks are bonded to both ends of the B block means that the B block is linked by covalent bonds through both ends of the chain of the A blocks. Since the first block has the above-described A-B-A type triblock structure, the heat-driven bending phenomenon at the operation conditions of the display to which the optiocal film of the present invention is attached can be effectively mitigated, whereby the light leakage phenomenon can be remarkably improved.

In the present invention, the A blocks and the B block in the first block preferably exhibit a micro phase separated structure. By forming the micro phase separated structure, the stress relaxation structure composed of the B block capable of effectively dissipating external stress can be included in the physically cross-linked structure composed of the first block to provide a polymer composition capable of forming a pressure-sensitive adhesive layer having excellent stress relaxation properties.

The first block may form spherical, cylindrical, gyroid and lamellar phases through the micro phase separated phenomenon. The microphase can be identified by imaging the polymer surface using an atomic force microscope (AFM) or observing it with a high magnification electron microscope. The first block of the present invention does not particularly limit the kind of the microphase, but in the case of being a spherical phase it can provide a polymer composition having excellent adhesive property and physically cross-linked property.

In the present invention, if the first block can satisfy the above-described glass transition temperature of the first block, the composition is not particularly limited, but for example, it can comprise A blocks and B blocks, having different glass transition temperatures from each other. The glass transition temperature of the above-mentioned A block may be 30° C. or higher, 40° C. or higher, or 50° C. or higher. The upper limit of the glass transition temperature of the A block is not particularly limited, but may be, for example, 200° C. or lower, 180° C. or lower, or 160° C. or lower. The glass transition temperature of the above-mentioned B block may be 0° C. or lower, −10° C. or lower, or −20° C. or lower. The lower limit of the glass transition temperature of the B block is not particularly limited, but may be, for example, −80° C. or higher, −70° C. or higher, or −60° C. or higher. By adjusting the glass transition temperature range of the A block and the B block as above, the bending phenomenon of the display due to the generated heat can be effectively mitigated in the condition where the display, to which the optical film of the present invention is attached, is driven, whereby the light leakage phenomenon can be remarkably improved.

If the A block can satisfy the above-described glass transition temperature, the composition is not particularly limited, but for example, can comprise, as a main component, a polymerized unit derived from one or more selected from the group consisting of alkyl methacrylate, acrylamide, N-alkyl acrylamide, styrene, styrene derivatives, maleimide and acrylonitrile. In one example, as alkyl methacrylate and N-alkyl acrylamide, those having an alkyl group with 1 to 20 carbon atoms, 1 to 16 carbon atoms, 1 to 12 carbon atoms, 1 to 8 carbon atoms, or 1 to 4 carbon atoms may be used in consideration of control of cohesive force, glass transition temperature and tackiness, and the like. In one example, as styrene derivatives, one or more of α-methylstyrene, t-butylstyrene, p-chlorostyrene, chloromethylstyrene and vinyltoluene may be used. Preferably, the A block may comprise, as a main component, a polymerized unit derived from one or more selected from the group consisting of methyl methacrylate and styrene. Or the A block may comprise, as a main component, a polymerized unit derived from methyl methacrylate and styrene. In the present invention, the phrase "comprising as a main component" means to comprise more than 50% by weight, 55% by weight, 65% by weight, 75% by weight or 95% by weight. As the A block comprises, as a main component, the above-mentioned polymerized unit, it is possible to provide a polymer composition capable of forming a pressure-sensitive adhesive layer suitable for an optical laminate and a display device.

If the B block can satisfy the above-described glass transition temperature, the composition is not particularly limited, but for example, may comprise, as a main component, a polymerized unit derived from one or more selected from the group consisting of alkyl acrylates, olefinic compounds, diene compounds and alkylene oxides. In one example, as the alkyl acrylate, an alkyl acrylate having an alkyl group with 1 to 20 carbon atoms, 1 to 16 carbon atoms, 1 to 12 carbon atoms, 1 to 8 carbon atoms, or 1 to 4 carbon atoms can be used in consideration of control of cohesive force, glass transition temperature and tackiness, and the like. In one example, as the olefinic compound and the diene compound, an olefin compound and a diene compound, having 1 to 20 carbon atoms, 1 to 16 carbon atoms, 1 to 12 carbon atoms, 1 to 8 carbon atoms, or 1 to 4 carbon atoms may be used in consideration of control of cohesive force, glass transition temperature and tackiness, and the like. In one example, as the alkylene oxide, an alkylene oxide having an alkylene group with 1 to 20 carbon atoms, 1 to 16 carbon atoms, 1 to 12 carbon atoms, 1 to 8 carbon atoms, or 1 to 4 carbon atoms may be used in consideration of control of cohesive force, glass transition temperature and tackiness, and the like. Preferably, the B block may comprise, as a main component, a polymerized unit derived from butyl acrylate, ethylene glycol or 2-ethylhexyl acrylate. As the B block comprises, as a main component, the above-described polymerized unit, it is possible to provide a polymer composition capable of forming a pressure-sensitive adhesive layer suitable for an optical laminate and a display device.

The first block may have a number average molecular weight (Mn) of, for example, 15,000 or more, 20,000 or more, or 25,000 or more. The upper limit of the number average molecular weight (Mn) of the first block may be 150,000 or less, 100,000 or less, or 50,000 or less. The first block may have, for example, a polydispersity index (PDI: Mw/Mn), that is, a ratio of the weight average molecular weight (Mw) to the number average molecular weight (Mn), of 3 or less, 2.2 or less, or 1.4 or less. The lower limit of the polydispersity index (Mw/Mn) may be 1.01 or more, 1.15 or more, or 1.3 or more. In the present invention, the number average molecular weight and the weight average molecular weight can be measured, for example, by a method shown in Examples using GPC (Gel Permeation Chromatograph). By adjusting the number average molecular weight and polydispersity of the first block in the range as above, it is possible to provide a polymer composition capable of forming a pressure-sensitive adhesive layer having excellent durability and dimensional stability.

If the second block can satisfy the above-described glass transition temperature, the composition is not particularly limited, but for example, may comprise, as a main component, a polymerized unit derived from alkyl acrylate. In one example, as the alkyl acrylate, alkyl acrylate having an alkyl group with 1 to 20 carbon atoms, 1 to 16 carbon atoms, 1 to 12 carbon atoms, 1 to 8 carbon atoms or 1 to 4 carbon atoms may be used in consideration of control of cohesive force, glass transition temperature and tackiness, and the like. Preferably, the alkyl acrylate may be butyl acrylate. As the second block comprises, as a main component, the above-described polymerized unit, it is possible to provide a polymer composition capable of forming a pressure-sensitive adhesive layer suitable for an optical laminate and a display device.

In addition, the second block may further comprise, for example, a polymerized unit derived from 0.1 parts by weight or more, 0.3 parts by weight or more or 0.5 parts by weight or more of a cross-linkable monomer, relative to 100 parts by weight of alkyl acrylate. The second block may further comprise, for example, a polymerized unit derived from 5 parts by weight or less, 3.3 parts by weight or less or 1.5 parts by weight or less of a cross-linkable monomer, relative to 100 parts by weight of alkyl acrylate. As the second block comprises the polymerized unit derived from the cross-linkable monomer in the above-described range, it is possible to provide a polymer composition capable of forming a pressure-sensitive adhesive layer having excellent bending suppression characteristics and maintaining the adhesive force depending on the temperature change.

In order for the block copolymer to form a physically cross-linked structure, it is preferred that the first block and the second block are immiscible to exhibit a micro phase separated structure. The block copolymer of the present invention comprises, for example, a first block and a second block, having the above-mentioned glass transition temperature, so that the first block and the second block can form a micro phase separated structure. In addition, the block copolymer of the present invention may comprise, for example, a first block and a second block, containing the above-described polymerized unit to form a micro phase separated structure.

By forming the micro phase separated structure, the stress relaxation structure composed of the second block capable of effectively dispersing external stress may be included in the physically cross-linked structure composed of the first block to provide a polymer composition capable of forming a pressure-sensitive adhesive layer having excellent stress relaxation characteristics.

The block copolymer may form spherical, cylindrical, gyroid and lamellar phases through the micro phase separation phenomenon. The microphase can be identified by imaging the polymer surface using an atomic force microscope (AFM) or observing it with a high magnification electron microscope. The block copolymer of the present invention does not particularly limit the kind of the microphase, but in the case of being a spherical phase it can provide a polymer composition having excellent adhesive property and physically cross-linked property.

In one example, the block copolymer may have the first block or the second block comprising a chemically cross-linkable functional group. The chemically cross-linkable functional group can be exemplified by a hydroxyl group, a carboxyl group, an isocyanato group, a glycidyl group, an amine group, an alkoxysilyl group or a vinyl group, and the like. Preferably, the cross-linkable functional group of the present invention may be a hydroxyl group. As the first block or the second block comprises the cross-linkable functional group, the polymer composition can form the pressure-sensitive adhesive layer having excellent adhesive reliability, re-workability and cutting property.

The cross-linkable functional group may be included in, for example, a second block having a low glass transition temperature. As the cross-linkable functional group is included in the second block having a relatively low glass transition temperature, it is possible to provide a polymer composition capable of forming a pressure-sensitive adhesive layer having excellent bending suppression characteristics and maintaining the adhesive force depending on the temperature change.

For example, the block copolymer may have the second block in a weight ratio of 65 wt % or more, 75 wt % or more, 80 wt % or more, or 85 wt % or more, based on the total weight of the first and second blocks. The upper limit of the weight ratio of the second block may be 95 wt % or less, 93 wt % or less, 91 wt % or less, or 87 wt % or less. As the weight ratio of the second block having a low glass transition temperature satisfies the above range, it is possible to provide a polymer composition capable of forming a pressure-sensitive adhesive layer having excellent bending suppression characteristics.

The block copolymer may have, for example, a number average molecular weight (Mn) of 100,000 or more, 150,000 or more, or 200,000 or more. The upper limit of the number average molecular weight (Mn) of the block copolymer may be 800,000 or less, 600,000 or less, or 400,000 or less. The block copolymer may have a polydispersity index (PDI; Mw/Mn), that is, a ratio of a weight average molecular weight (Mw) to a number average molecular weight (Mn), of 5 or less, 4.1 or less, or 3.2 or less. The lower limit of the polydispersity index (Mw/Mn) may be 1.1 or more, 1.45 or more, or 1.8 or more. By controlling the number average molecular weight and the polydispersity index of the block copolymer in the range as above, it is possible to provide a polymer composition capable of forming a pressure-sensitive adhesive layer having excellent durability and dimensional stability.

The method for producing the block copolymer is not particularly limited and can be produced in a usual manner. The block polymer may be polymerized by, for example, an LRP (Living Radical Polymerization) method, and the example thereof includes an atom transfer radical polymerization (ATRP) using a transition metal halide complex as a polymerization control agent, an ARGET (activators regenerated by electron transfer) ATRP, using a transition metal halide complex at a higher oxidation state with an organic or inorganic reducing agent as a polymerization control agent, an ICAR (initiators for continuous activator regeneration) ATRP, using a transition metal halide complex at a higher oxidation state with a radical initiator, a radical polymerization method by reversible addition-fragmentation chain transfer (RAFT) using a reversible chain transfer agent or a method of using an organic tellurium compound as an initiator, and the like, where an appropriate method of these methods can be selected and applied.

In one example, a bifunctional polymerization initiator composed of the B block is prepared using a bifunctional initiator and a chain extension reaction is performed with the A block to prepare a bifunctional triblock polymer initiator of the A-B-A type as the first block. Thereafter, the chain extension reaction is performed to a second block to prepare a block copolymer of the present invention.

The polymer composition of the present invention may comprise a multifunctional cross-linking agent. As long as the multifunctional cross-linking agent has at least two or more of the functional groups capable of performing a cross-linking reaction by reacting with the cross-linkable functional group contained in the block copolymer of the present invention, it is not particularly limited, but for example, an isocyanate cross-linking agent, an epoxy cross-linking agent, an aziridine cross-linking agent or a metal chelate cross-linking agent, and the like can be used, and preferably, an isocyanate cross-linking agent can be used.

As the isocyanate cross-linking agent, for example, a diisocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a compound obtained by reacting the diisocyanate compound with a polyol can be used, whereas the polyol, for example, trimethylolpropane and the like can be used.

In a pressure-sensitive adhesive composition, one or two or more cross-linking agents of the foregoing can be used, but the usable cross-linking agent is not limited thereto.

In one example, the multifunctional cross-linking agent may be contained in the polymer composition in an amount of 0.05 parts by weight or more, or 0.1 parts by weight or more, relative to 100 parts by weight of the block copolymer. The upper limit of the content of the multifunctional cross-linking agent may be 0.35 parts by weight or less, or 0.3 parts by weight or less. In this range, the pressure-sensitive adhesive layer formed of the polymer composition can maintain excellent gel fraction, cohesive force, adhesive force, durability, etc.

The present invention also relates to an optical laminate.

An exemplary optical laminate may comprise an optical film; and a pressure-sensitive adhesive layer formed on one side of the optical film. The pressure-sensitive adhesive layer may be, for example, a pressure-sensitive adhesive layer for attaching the optical film to a liquid crystal panel or other optical film of a display device. The pressure-sensitive adhesive layer may comprise, as a main component, a cross-linked product of the polymer composition of the present invention as described above. Here, as the optical film, a polarizing film, a retardation film, a brightness enhancement film, or a laminate in which two or more of the above are laminated can be exemplified.

In the present invention, the optical laminate may be an optical laminate in which the optical film is a polarizing film. The kind of the polarizing film included in the optical laminate is not particularly limited, and general types known in this field, such as polyvinyl alcohol-based polarizing film, can be adopted without limitation.

The polarizing film is a functional film capable of extracting only light oscillating in one direction from light to be incident while oscillating in various directions. Such a polarizing film may be, for example, in a form in which a dichroic dye is adsorbed and oriented in a polyvinyl alcohol-based resin film. The polyvinyl alcohol-based resin constituting the polarizing film can be obtained, for example, by being subjected to gelation of a polyvinyl acetate-based resin. In this case, the polyvinyl acetate-based resin that can be used may comprise not only a homopolymer of vinyl acetate but also a copolymer of vinyl acetate and other monomers copolymerizable therewith. Here, an example of the monomer copolymerizable with vinyl acetate may include unsaturated carboxylic acids, olefins, vinyl ethers, unsaturated sulfonic acids and acrylamides having an ammonium group, and the like alone or in a mixture of two or more of the foregoing, but it not limited thereto. The polyvinyl alcohol-based resin may have a gelation degree of, usually, 85 mol % to 100 mol % or so, preferably 98 mol % or more. The polyvinyl alcohol-based resin may also be further modified, and for example, polyvinyl formal or polyvinyl acetal modified with aldehydes may also be used. In addition, the polyvinyl alcohol-based resin may have a polymerization degree of, usually, 1,000 to 10,000 or so, or 1,500 to 5,000 or so.

The polarizing film may be produced through a process of stretching the polyvinyl alcohol-based resin film as described above (e.g., uniaxial drawing), a process of dyeing the polyvinyl alcohol-based resin film with a dichroic dye and adsorbing the dichroic dye, a process of treating the dichroic dye-adsorbed polyvinyl alcohol-based resin film with an aqueous solution of boric acid and a process of water washing after treatment with the aqueous solution of boric acid, and the like. Here, as the dichroic dye, iodine or a dichroic organic dye, and the like may be used.

The polarizing plate may further comprise a protective film attached to one side or both sides of the polarizing film, and in this case, the pressure sensitive adhesive layer may be formed on one side of the protective film. The kind of the protective film is not particularly limited, and for example, a film having one layer or a laminated structure of two or more layers, and the like of a cellulose-based film such as TAC (triacetyl cellulose); a polyester-based film such as a polycarbonate film or PET (poly(ethylene terephthalate)); a polyether sulfone-based films; or a polyethylene film, a polypropylene film or a polyolefin-based film produced by using a resin having a cyclo or norbornene structure or an ethylene-propylene copolymer, and the like may be used.

The polarizing plate may further comprise at least one functional layer selected from the group consisting of a protective layer, a reflective layer, an antiglare layer, a retardation plate, a wide view angle compensation film, and a brightness enhancement film.

The present invention also relates to a pressure-sensitive adhesive optical film. In the exemplary pressure-sensitive adhesive optical film of the present invention, the pressure sensitive adhesive layer may be provided on the optical film through a primer layer. The pressure-sensitive adhesive layer may be formed by a pressure-sensitive adhesive comprising, as a base polymer, a block copolymer having a (meth)acrylic polymer (A') segment with a glass transition temperature of 0° C. or lower, −10° C. or lower, or −20° C. or lower and a (meth)acrylic polymer (B') segment with a glass transition temperature of 30° C. or higher, 40° C. or higher, or 50° C. or higher. The lower limit of the glass transition temperature of the A' segment is not particularly limited, but may be, for example, −80° C. or higher, −70° C. or higher, or −60° C. or higher. The upper limit of the glass transition temperature of the B' segment is not particularly limited, but may be, for example, 200° C. or lower, 180° C. or lower, or 160° C. or lower. By adjusting the ranges of the glass transition temperatures of the A' and B' segments as described above, the bending phenomenon of the display due to the generated heat can be effectively mitigated in the condition where the display, to which the optical film is attached, is driven, whereby the light leakage phenomenon can be remarkably improved.

As long as the A' segment can satisfy the above-described glass transition temperature, the composition thereof is not particularly limited, but for example, may comprise, as a main component, a polymerized unit derived from one or more selected from the group consisting of an alkyl acrylate, an olefin compound, a diene compound and alkylene oxide. In one example, as the alkyl acrylate, alkyl acrylate having an alkyl group with 1 to 20 carbon atoms, 1 to 16 carbon atoms, 1 to 12 carbon atoms, 1 to 8 carbon atoms or 1 to 4 carbon atoms can be used in consideration of control of cohesive force, glass transition temperature and tackiness, and the like. In one example, as the olefin compound and the diene compound, an olefin compound and a diene compound, having 1 to 20 carbon atoms, 1 to 16 carbon atoms, 1 to 12 carbon atoms, 1 to 8 carbon atoms or 1 to 4 carbon atoms, can be used in consideration of control of cohesive force, glass transition temperature and tackiness, and the like. In one example, as the alkylene oxide, alkylene oxide having an alkylene group with 1 to 20 carbon atoms, 1 to 16 carbon atoms, 1 to 12 carbon atoms, 1 to 8 carbon atoms or 1 to 4 carbon atoms can be used in consideration of control of cohesive force, glass transition temperature and tackiness, and the like. Preferably, the A' segment may comprise, as a main component, a polymerized unit derived from butyl acrylate, ethylene glycol or 2-ethylhexyl acrylate. As the A' segment comprises, as a main component, the above-described polymerized unit, it is possible to provide a base polymer capable of forming a pressure-sensitive adhesive layer suitable for a pressure-sensitive adhesive optical film.

As long as the B' segment can satisfy the above-described glass transition temperature, the composition thereof is not particularly limited, but for example, may comprise, as a main component, a polymerized unit derived from one or more selected from the group consisting of alkyl methacrylate, acrylamide, N-alkyl acrylamide, styrene, a styrene derivative, maleimide and acrylonitrile. In one example, as the alkyl methacrylate and N-alkyl acrylamide, those having an alkyl group with 1 to 20 carbon atoms, 1 to 16 carbon atoms, 1 to 12 carbon atoms, 1 to 8 carbon atoms or 1 to 4 carbon atoms can be used in consideration of control of cohesive force, glass transition temperature and tackiness, and the like. In one example, as the styrene derivative, one or more of α-methylstyrene, t-butylstyrene, p-chlorostyrene, chloromethylstyrene and vinyltoluene may be used. Preferably, the B' segment may comprise, as a main component, a polymerized unit derived from one or more selected from the group consisting of methyl methacrylate and styrene. Or the B' segment may comprise, as a main component, a polymerized unit derived from methyl methacrylate and styrene. As the B' segment comprises, as a main component, the above-described polymerized unit, it is possible to provide a base polymer capable of forming a pressure-sensitive adhesive layer suitable for a pressure-sensitive adhesive optical film.

In the present invention, for example, the base polymer may be a triblock copolymer in which the A' and B' segments are connected in the form of B'-A'-B'. As the base polymer has the triblock structure which is connected in the B'-A'-B' form as described above, the bending phenomenon of the display due to the generated heat can be effectively mitigated in the condition where the display, to which the pressure-sensitive adhesive optical film of the present invention is attached, is driven, whereby the light leakage phenomenon can be remarkably improved.

In the present invention, the A' segment and the B' segment of the base polymer preferably exhibit a micro phase separated structure. As the base polymer forms a micro phase separated structure, the stress relaxation structure composed of the A' segment capable of effectively dispersing external stress can be included in the physically cross-linked structure of the base polymer to form a pressure-sensitive adhesive layer having excellent stress relaxation properties.

In the present invention, the base polymer may further comprise, for example, a polymer (C) segment connected to the B' segment and having a glass transition temperature of 10° C. or lower, 0° C. or lower or −10° C. or lower. The lower limit of the glass transition temperature of the C segment is not particularly limited, but may be, for example, −80° C. or higher, −70° C. or higher, or −60° C. or higher. By controlling the glass transition temperature of the C segment within the above range, the base polymer and the C segment have a micro phase separated structure, which is described below, to form a physical cross-linking capable of forming a structure including a stress relaxation point. As the base polymer forms the physical cross-linking as described above, it is possible to provide a cross-linkable composition capable of forming a pressure-sensitive adhesive layer having excellent adhesive reliability, re-workability and cutting property.

As long as the C segment can satisfy the above-described glass transition temperature, the composition thereof is not particularly limited, but for example, may comprise, as a main component, a polymerized unit derived from alkyl acrylate. In one example, as the alkyl acrylate, alkyl acrylate having an alkyl group with 1 to 20 carbon atoms, 1 to 16 carbon atoms, 1 to 12 carbon atoms, 1 to 8 carbon atoms or 1 to 4 carbon atoms can be used in consideration of control of cohesive force, glass transition temperature and tackiness, and the like. Preferably, the alkyl acrylate may be butyl acrylate. As the C segment comprises, as a main component, the above-described polymerized unit, it is possible to provide a pressure-sensitive adhesive optical film comprising a pressure-sensitive adhesive layer suitable for an optical laminate and a display device.

In one example, the C segment may comprise a chemically cross-linkable functional group. The chemically cross-linkable functional group can be exemplified by a hydroxyl group, a carboxyl group, an isocyanate group, a glycidyl group, an amine group, an alkoxysilyl group or a vinyl group, and the like. Preferably, the cross-linkable functional group of the present invention may be a hydroxyl group. As the C segment comprises the cross-linkable functional group, it is possible to provide a pressure-sensitive adhesive optical film comprising a pressure-sensitive adhesive layer having excellent adhesive reliability, re-workability, and cutting property.

For example, the base polymer may have the C segment in a weight ratio of 65 wt % or more, 75 wt % or more, 80 wt % or more, or 85 wt % or more. The upper limit of the weight ratio of the C segment may be 95 wt % or less, 93 wt % or less, 91 wt % or less, or 87 wt % or less. As the weight ratio of the C segment having a low glass transition temperature satisfies the above range, it is possible to provide a pressure-sensitive adhesive optical film comprising a pressure-sensitive adhesive layer having excellent bending suppression characteristics.

The molecular weight, polydispersity index and production method of the base polymer are the same as those described in the above-described molecular weight, polydispersity index and production method of the block copolymer of the polymer composition of the present invention, and thus they are omitted.

The primer layer is formed by a primer containing polymers and an antioxidant. It is preferred that the material of the polymer may exhibit good adhesiveness with any of a pressure-sensitive adhesive layer and an optical film, such as a liquid crystal optical compensation layer, and form a coating having excellent cohesive force.

The polymers may include polyurethane resins, polyester resins, and polymers containing amino groups in molecules. The type of usage of the polymer may be any of the solvent-soluble type, water-dispersible type and water-soluble type. For example, water-soluble polyurethane, water-soluble polyester or water-soluble polyamide, and the like or water-dispersible resins (ethylene-vinyl acetate emulsion, (meth)acrylic emulsion and the like) may be included. In addition, as the water-dispersible type, one obtained by emulsifying various resins such as polyurethane, polyester and polyamide using an emulsifying agent, or an emulsified product formed by introducing an anionic group, a cationic group or a nonionic group of a water-dispersible hydrophilic group into the resin, and the like can be used. Also, an ionic polymer complex can be used.

For example, when an isocyanate compound is included in the pressure-sensitive adhesive layer, the polymers preferably have a functional group having reactivity with the isocyanate compound. As the polymers, polymers containing amino groups in molecules are preferable. In particular, those having a primary amino group at the terminal thereof are preferably used, whereby they are firmly stuck by the reaction with the isocyanate compound and have improved durability. The polymer having a primary amino group at the terminal is preferably a poly (meth)acrylic ester having a primary amino group at the terminal.

The polymers containing amino groups in molecules may include polyethyleneimine, polyallylamine, polyvinylamine, polyvinylpyridine, polyvinylpyrrolidine and polymers of amino group-containing monomers such as dimethylaminoacrylic ethyl, and the like. Of these, polyethyleneimine is preferable. The polyethyleneimine-based material is preferably one having a polyethyleneimine structure, and for example, may include polyethyleneimine, ethyleneimine adducts into polyacrylic acid esters and/or polyethyleneimine adducts. Particularly, ethyleneimine adducts into polyacrylic acid esters and/or polyethylene imine adducts, which are poly (meth)acrylic acid esters having a primary amino group at the terminal, are suitable.

The polyethyleneimine is not particularly limited, and various materials can be used. The weight average molecular weight of the polyethyleneimine is not particularly limited, but is generally 100 to 1,000,000 or so. For example, an example of the commercially available product of polyethyleneimine may include EPOMIN SP series (SP-003, SP006, SP012, SP018, SP103, SP110 and SP200), and EPOMIN P-1000, of Nihon Shokubai Co., Ltd., and the like. Of these, EPOMIN P-1000 is suitable.

Ethyleneimine adducts into polyacrylic acid esters and/or polyacrylic ester of polyethylenimine adducts are obtained by emulsion polymerization of alkyl (meth)acrylate and their copolymerizable monomers constituting the base polymer (acrylic polymer) of acrylic pressure-sensitive adhesives to be described below. As the copolymerizable monomer, a monomer having a functional group such as a carboxyl group is used for reacting ethyleneimine or the like. The use ratio of the monomer having a functional group such as a carboxyl group is suitably adjusted by the ratio of the ethyleneimine or the like to be reacted. Also, as the copolymerizable monomer, it is suitable to use a styrene-based monomer. In addition, by reacting the separately synthesized polyethyleneimine with a carboxyl group or the like in acrylic acid ester, adducts obtained by grafting polyethyleneimine may also be used. For example, an example of the commercially available product may include POLYMENT NK-380 of Nihon Shokubai Co., Ltd.

Furthermore, ethyleneimine adducts of acrylic polymer emulsions and/or polyethyleneimine adducts and the like may be used. For example, an example of the commercially available product may include POLYMENT SK-1000 of Nihon Shokubai Co., Ltd.

Besides, the polymer having a primary amino group at the terminal may include those that a primary amino group is introduced at the terminal by reacting a carboxyl group or a hydroxyl group in polyacrylic acid ester with an excessive amount of diisocyanate and also reacting it with an excessive amount of diamine. In addition, the poly(meth)acrylic acid ester having a primary amino group at the terminal is obtained by copolymerizing the (meth)acrylic acid ester with a monomer having a primary amino group at the terminal. For example, the monomer having a primary amino group at the terminal may include aminoethyl (meth)acrylate and aminopropyl (meth)acrylate, and the like.

Furthermore, in addition to the polymers, various additives such as an antioxidant may also be suitably used in the primer layer, if necessary, within the scope not departing from the object of the present invention.

The antioxidant contained in the primer layer may include phenol-based, phosphorus-based, sulfur-based and amine-based antioxidants, and at least one or more selected from these can be used. Among them, the phenol-based antioxidant is preferable.

A specific example of the phenol-based antioxidant may include, as a monocyclic phenol compound, 2,6-di-t-butyl-p-cresol, 2,6-di-t-butyl-4-ethylphenol, 2,6-dicyclohexyl-methylphenol, 2,6-diisopropyl-4-ethylphenol, 2,6-di-t-amyl-4-methylphenol, 2,6-di-t-octyl-4-n-propylphenol, 2,6-dicyclohexyl-4-n-octylphenol, 2-isopropyl-4-methyl-6-t-butylphenol, 2-t-butyl-4-ethyl-6-t-octylphenol, 2-isobutyl-4-ethyl-6-t-hexylphenol, 2-cyclohexyl-4-n-butyl-6-isopropylphenol, styrenated mixed cresol, DL-α-tocopherol and stearyl β-(3,5-di-t-butyl-4-hydroxyphenyl)propionate and the like; may include, as a dicyclic phenol compound, 2,2'-methylenebis(4-methyl-6-t-butylphenol), 4,4'-butylidenebis(3-methyl-6-t-butylphenol), 4,4'-thiobis(3-methyl-6-t-butylphenol), 2,2'-thiobis(4-methyl-6-t-butylphenol), 4,4'-methylenebis(2,6-di-t-butylphenol), 2,2'-methylenebis[6-(1-methylcyclohexyl)-p-cresol], 2,2'-ethylidenebis(4,6-di-t-butylphenol), 2,2'-butylidenebis(2-t-butyl-4-methylphenol), 3,6-dioxaoctamethylenebis[3-(3-t-butyl-4-hydroxy-5-methylphenyl)propionate], triethylene glycolbis[3-(3-t-butyl-5-methyl-4-hydroxyphenyl)propionate], 1,6-hexanediolbis[3-(3,5-di-t-butyl-4-hydroxyphenyl) propionate] and 2,2'-thiodiethylenebis[3-(3,5-di-t-butyl-4-hydroxyphenyl)propionate], and the like; may include, as a tricyclic phenol compound, 1,1,3-tris(2-methyl-4-hydroxy-5-t-butylphenyl)butane, 1,3,5-tris(2,6-dimethyl-3-hydroxy-4-t-butylbenzyl)isocyanurate, 1,3,5-tris[(3,5-di-t-butyl-4-hydroxyphenyl)propionyloxyethyl]isocyanurate, tris(4-t-butyl-2,6-dimethyl-3-hydroxybenzyl)isocyanurate and 1,3,5-trimethyl-2,4,6-tris(3,5-di-t-butyl-4-hydroxybenzyl) benzene and the like; may include, as a tetracyclic phenol compound, tetrakis[methylene-3-(3,5-di-t-butyl-4-hydroxyphenyl)propionate]methane; and may include, as a phosphorus-containing phenol compound, bis(ethyl 3,5-di-t-butyl-4-hydroxybenzylphosphonate) calcium and bis(ethyl 3,5-di-t-butyl-4-hydroxybenzylphosphonate) nickel, and the like.

A specific example of the phosphorus antioxidant may include trioctyl phosphite, trilauryl phosphite, tristridecyl phosphite, trisisodecyl phosphite, phenyl diisooctyl phosphite, phenyl diisodecyl phosphite, phenyl di(tridecyl) phosphite, diphenyl isooctyl phosphite, diphenyl isodecyl phosphite, diphenyl tridecyl phosphite, triphenyl phosphite, tris (nonylphenyl) phosphite, tris(2,4-di-t-butylphenyl) phosphite, tris(butoxyethyl) phosphite, tetratridecyl-4,4'-butylidenebis(3-methyl-6-t-butylphenol)-diphosphate, 4,4'-isopropylidene-diphenol alkyl phosphite (provided that alkyl has about 12 to 15 carbon atoms), 4,4'-isopropylidenebis(2-t-butylphenol) di(nonylphenyl) phosphite, tris(biphenyl) phosphite, tetra(tridecyl)-1,1,3-tris(2-methyl-5-t-butyl-4-hydroxyphenyl) butane diphosphite, tris(3,5-di-t-butyl-4-hydroxyphenyl) phosphite, hydrogenated-4,4'-isopropylidene diphenol polyphosphite, bis(octylphenyl) bis [4,4'-butylidenebis(3-methyl-6-t-butylphenol)] 1,6-hexanediol diphosphite, hexatridecyl-1,1,3-tris(2-methyl-4-hydroxy-5-t-butylphenol) diphosphite, tris[4,4'-isopropylidenebis(2-t-butylphenol)] phosphite, tris(1,3-distearoyloxyisopropyl) phosphite, 9,10-dihydro-9-phosphaphenanthrene-10-oxide, tetrakis(2,4-di-t-butylphenyl)-4,4'-biphenylene diphosphonite, distearyl pentaerythritol diphosphite, di(nonylphenyl) pentaerythritol diphosphite, phenyl 4,4'-isopropylidene diphenol pentaerythritol diphosphite, bis(2,4-di-t-butylphenyl) pentaerythritol diphosphite, bis(2,6-di-t-butyl-4-methylphenyl) pentaerythritol diphosphite and phenyl bisphenol-A-pentaerythritol diphosphite, and the like.

As the sulfur-based antioxidant, it is preferred to use dialkyl thiodipropionate, and a polyhydric alcohol ester of alkylthiopropionic acid. As the dialkyl thiodipropionate used herein, dialkyl thiodipropionate having an alkyl group having 6 to 20 carbon atoms is preferable, and as the polyhydric alcohol ester of alkyl thiopropionic acid, a polydhydric alcohol ester of alkyl thiopropionic acid having an alkyl group having 4 to 20 carbon atoms is also preferable. In this case, an example of the polyhydric alcohol constituting the polyhydric alcohol ester may include glycerin, trimethylol ethane, trimethylol propane, pentaerythritol and trishydroxyethylisocyanurate, and the like. This dialkyl thiodipropionate may include, for example, dilauryl thiodipropionate, dimyristyl thiodipropionate and distearyl thiodipropionate, and the like. On the other hand, the polyhydric alcohol ester of alkyl thiopropionic acid may include, for example, glycerin tributyl thiopropionate, glycerin trioctyl thiopropionate, glycerin trilauryl thiopropionate, glycerin tristearyl thiopropionate, trimethylol ethane tributyl thiopropionate, trimethylol ethane trioctyl thiopropionate, trimethylol ethane trilauryl thiopropionate, trimethylol ethane tristearyl thiopropionate, pentaerythritol tetrabutyl thiopropionate, pentaerythritol tetraoctyl thiopropionate and pentaerythritol tetralauryl thiopropionate, pentaerythritol tetrastearyl thiopropionate, and the like.

A specific example of the amine-based antioxidant may include bis(2,2,6,6-tetramethyl-4-piperidyl) sebacate, a polycondensate of dimethyl succinate and 1-(2-hydroxyethyl)-4-hydroxy-2,2,6,6-tetramethylpiperidine ethanol, N,N',N'',N'''-tetrakis-(4,6-bis-(butyl-(N-methyl-2,2,6,6-tetramethylpiperidin-4-yl)amino)-triazine-2-yl)-4,7-diazadecane-1,10-diamine, a polycondensate of dibutylamine 1,3,5-triazine N,N'-bis(2,2,6,6-tetramethyl-4-piperidyl) 1,6-hexamethylenediamine and N-(2,2,6,6-tetramethyl-4-piperidyl) butylamine, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], tetrakis(2,2,6,6-tetramethyl-4-piperidyl)-1,2,3,4-butane tetracarboxylate, 2,2,6,6-tetramethyl-4-piperidyl benzoate, bis-(1,2,6,6-pentamethyl-4-piperidyl)-2-(3,5-di-t-butyl-4-hydroxybenzyl)-2-n-butyl malonate, bis-(N-methyl-2,2,6,6-tetramethyl-4-piperidyl) sebacate, 1,1'-(1,2-ethanediyl) bis(3,3,5,5-tetramethylpiperazinone), mixed (2,2,6,6-tetramethyl-4-piperidyl/tridecyl)-1,2,3,4-butane tetracarboxylate, mixed (1,2,2,6,6-pentamethyl-4-piperidyl/tridecyl)-1,2,3,4-butane tetracarboxylate, mixed [2,2,6,6-tetramethyl-4-piperidyl/β,β,β',β'-tetramethyl-3,9-[2,4,8,10-tetraoxaspiro(5,5)undecane]diethyl]-1,2,3,4-butane tetracarboxylate, mixed [1,2,2,6,6-pentamethyl-4-piperidyl/β,β,β',β'-tetramethyl-3,9-[2,4,8,10-tetraoxaspiro(5,5)undecane]diethyl]-1,2,3,4-butane tetracarboxylate, N,N'-bis(3-aminopropyl)ethylenediamine-2,4-bis[N-butyl-N-(1,2,2,6,6-pentamethyl-4-piperidyl)amino]-6-chloro-1,3,5-triazine condensate, poly[6-N-morpholyl-1,3,5-triazine-2,4-diyl][(2,2,6,6-tetramethyl-4-piperidyl)imino]hexamethylene[(2,2,6,6-tetramethyl-4-piperidyl)imide], a condensate of N,N'-bis(2,2,6,6-tetramethyl-4-piperidyl)hexamethylenediamine and 1,2-dibromoethane and [N-(2,2,6,6-tetramethyl-4-piperidyl)-2-methyl-2-(2,2,6,6-tetramethyl-4-piperidyl)imino] propionamide, and the like.

When the primer layer comprises the polymers and the antioxidant, it may generally comprise 0.01 to 500 parts by weight of the antioxidant relative to 100 parts by weight of the polymers. When the use ratio of the antioxidant corresponds to the above range, it is possible to provide a primer layer having good anchoring properties and appearance, and excellent antioxidant performance. The use ratio of the antioxidant is preferably 0.1 to 300 parts by weight, or 1 to 100 parts by weight, relative to 100 parts by weight of the polymers.

In addition, the primer layer may comprise a cross-linking agent together with the polymers. For example, the strength of the primer layer can be improved by mixing and cross-inking a cross-linking agent that reacts with polymers containing an amino group. As the cross-linking agent that reacts with the polymer including an amino group, an epoxy compound, and the like can be exemplified. The production of the pressure-sensitive adhesive optical film of the present invention is carried out, for example, by forming a primer layer on an optical film, such as a liquid crystal optical compensation layer, and forming a pressure-sensitive adhesive layer.

The formation of the primer layer can be achieved, for example, by applying a primer solution containing the polymers and the antioxidant with an application method such as a coating method, a dipping method and a spraying method, followed by drying. The thickness of the primer layer is preferably 10 to 5000 nm or 50 to 500 nm. If the thickness of the primer layer is reduced, the primer layer does not exhibit sufficient strength, whereby sufficient adhesiveness cannot be obtained. Also, if the thickness is too thick, the optical characteristics may deteriorate. In addition, the coating amount (solid content) of the primer layer is preferably 0.1 to 5 $cm^3$, 0.1 to 1 $cm^3$, or 0.1 to 0.5 $cm^3$ per $m^2$.

The formation of the pressure-sensitive adhesive layer is carried out by laminating it on the primer layer. The forming method is not particularly limited, and a method of applying and drying a pressure-sensitive adhesive (solution), a transferring method by a release sheet provided with a pressure-sensitive adhesive layer, and the like can be used. As the coating method, a roll coating method such as reverse coating or gravure coating, a spin coating method, a screen coating method, a fountain coating method, a dipping method, a spraying method and the like can be adopted.

The constituent material of the release sheet may include a thin leaf body, such as a paper, a synthetic resin film such as polyethylene, polypropylene and polyethylene terephthalate, a rubber sheet, a paper, a cloth, a nonwoven fabric, a net, a foam sheet or a metal foil and a laminate thereof, and the like. In order to improve detachability from the pressure-sensitive adhesive layer, a release treatment such as a silicone treatment, a long-chain alkyl treatment or a fluorine treatment may be performed on the surface of the release sheet, if necessary.

The present invention is also directed to a display device, for example, a liquid crystal display device. An exemplary display device may comprise a liquid crystal panel and the polarizing plate or optical laminate attached to one side or both sides of the liquid crystal panel. The polarizing plate or optical laminate may be attached to the liquid crystal panel by the above-described pressure-sensitive adhesive.

As the liquid crystal panel in the device, all the known panels, for example, a passive matrix type panel such as a TN (twisted nematic) type, a STN (super twisted nematic) type, a F (ferroelectric) type or a PD (polymer dispersed) type; an active matrix type panel such as a two terminal type or a three terminal type; an in-plane switching (IPS) panel and a vertical alignment (VA) panel, and the like may be applied.

Furthermore, the kinds of other configurations of the liquid crystal display device, for example, upper and lower substrates such as a color filter substrate or an array substrate, are also not particularly limited, and configurations known in this field can be adopted without limitation.

Advantageous Effects

The present invention can provide a polymer composition capable of forming a pressure-sensitive adhesive layer which has excellent workability, durability and dimensional stability and is capable of effectively alleviating the bending phenomenon of the display, through a polymer capable of forming a physically cross-linked structure together with a chemically cross-linked structure, and can provide an optical laminate comprising a cross-linked product of such a polymer composition and a display device comprising the same.

BRIEF DESCRIPTION OF DRAWINGS

FIG. 1 is a diagram showing a structure of an exemplary pressure-sensitive adhesive optical film of the present invention.

MODE FOR INVENTION

Hereinafter, the present invention will be described in more detail through the examples according to the present invention and comparative examples not complying with the present invention, but the scope of the present invention is not limited by the following examples.

In the following examples, Mw means a weight average molecular weight, and Mn means a number average molecular weight.

1. Molecular Weight Measurement

The number average molecular weight (Mn) and the molecular weight distribution (PDI) were measured using GPC (gel permeation chromatography) under the following conditions, and for producing a calibration curve, the measurement results were converted using standard polystyrene of Agilent system.

<Measuring Conditions>
Measuring instrument: Agilent GPC (Agilent 1200 series, U.S.)
Column: Two PL Mixed B connected
Column temperature: 40° C.
Eluent: THF (tetrahydrofuran)
Flow rate: 1.0 mL/min
Concentration: ~1 mg/mL (100 μl injection)

2. Durability Evaluation Method

The pressure-sensitive adhesive polarizing plate produced in Examples or Comparative Examples was tailored to have a width of 320 cm and a height of 180 cm to prepare a specimen. The prepared specimen is attached to a commercially available LCD panel having a thickness of about 0.7 mm via a pressure-sensitive adhesive layer, and the panel with the attached specimen is stored at 50° C. and 5 atm for about 20 minutes to prepare a sample. After the prepared sample is maintained at 80° C. for 300 hours, the durability is evaluated according to the following criteria by observing whether or not bubbles or peeling phenomena occur at the pressure-sensitive adhesive interface of the pressure-sensitive adhesive layer.

<Evaluation Criteria for Durability>
A: When the occurrence of bubbles and peeling phenomena are not observed
B: When bubbles and/or peeling phenomena are slightly observed
C: When a large amount of bubbles and/or peeling phenomena are observed 3. Evaluation Method of Bending Suppression Force The pressure-sensitive adhesive polarizing plate produced in Examples or Comparative Examples is tailored to have a width of 3 cm and a height of 40.5 cm to prepare a specimen. The prepared specimen is attached to a panel for LCD having a thickness of about 0.7 mm, and a width of 4 cm and a height of 42 cm via a pressure-sensitive adhesive layer. One end of the specimen is attached to an oven wall with an iron plate support using a magnet, and the distance that the other end is spaced from the wall is measured (d1). After storing the specimen at 60° C. for 72 hours, the bending is measured by measuring the distance (d2) spaced from the oven wall. A relative fraction of bending is calculated based on the bending value of the specimen using the random copolymer of Comparative Example 3.

Bending=$d2-d1$

Relative bending fraction (%)=(bending of a specimen/bending of the reference specimen)×100

Preparation Example 1. Preparation Example of Pentablock Copolymer (A1)

0.5 g of ethylene bis(2-bromoisobutyrate), 15.5 g of butyl acrylate (BA) and 16 g of ethyl acetate were placed in a 500 mL round-bottom flask and sealed, and then the nitrogen bubbling was performed for about 40 minutes to remove oxygen. After removing oxygen, the flask was placed in an oil bath heated to 65° C. and a solution containing 0.002 g of $CuBr_2$ and 0.006 g of TPMA (tris(2-pyridylmethyl)amine) dissolved in 0.1 mL of deoxygenated DMF (N,N-dimethylformamide) was introduced into the flask. Subsequently, the reaction was initiated by introducing 0.04 g of $Sn(EH)_2$ (tin (II) 2-ethylhexanoate) as a catalyst reducing agent thereto. At the point that a monomer conversion reached about 90%, 140 g of methyl methacrylate (MMA) and 140 g of ethyl acetate, in which oxygen was removed in advance, were introduced, and the nitrogen bubbling was additionally performed for 40 minutes to remove oxygen. When the temperature of the reactant reached 65° C., a solution containing 0.025 g of $CuBr_2$ and 0.064 g of TPMA (tris(2-pyridylmethyl)amine) dissolved in 1.0 mL of deoxygenated DMF (N,N-dimethylformamide) was introduced thereto and 0.49 g of $Sn(EH)_2$ (tin (II) 2-ethylhexanoate) was placed therein to perform a chain extension reaction. When the conversion reached 80% or more, the reaction was terminated, and a macroinitiator having a number average molecular weight (Mn) of 85,000 and a molecular weight distribution (Mw/Mn) of 1.32 was prepared. 100 g of the macroinitiator, obtained by precipitating the reaction mixture from methanol followed by vacuum drying, 840 g of butyl acrylate (BA), 8.5 g of 4-hydroxybutyl acrylate (4-HBA) and 1000 g of ethyl acetate were charged into a 3 L polymerization reactor and nitrogen was bubbled for about 60 minutes to remove oxygen. A catalyst solution prepared by mixing 0.047 g of $CuBr_2$, 0.12 g of TPMA (tris(2-pyridylmethyl)amine) and 5 mL of DMF (N,N-dimethylformamide), in a condition that the reaction temperature was maintained at 65° C. under a nitrogen atmosphere, was introduced thereto and 1.23 g of $Sn(EH)_2$ (tin (II) 2-ethylhexanoate) was introduced thereto to initiate the reaction. At the point that the reaction conversion reached about 70%, the reaction was terminated to produce a block copolymer solution having a molecular weight (Mn) of 350,000 and a molecular weight distribution (Mw/Mn) of 1.84. Here, the weight ratio of the first block and the second block is 14:86 or so.

Preparation Example 2. Preparation Example of Pentablock Copolymer (A2)

0.26 g of ethylene bis(2-bromoisobutyrate), 28.2 g of butyl acrylate (BA) and 30 g of ethyl acetate were placed in a 500 mL round-bottom flask and sealed, and then the nitrogen bubbling was performed for about 40 minutes to remove oxygen. After removing oxygen, the flask was placed in an oil bath heated to 65° C. and a solution containing 0.005 g of $CuBr_2$ and 0.013 g of TPMA (tris(2- pyridylmethyl)amine) dissolved in 0.2 mL of deoxygenated DMF (N,N-dimethylformamide) was introduced into the flask. Subsequently, the reaction was initiated by introducing 0.72 g of a solution containing 5 wt % of azobisisobutyronitrile (AIBN) as a catalyst reducing agent and ethyl acetate as a solvent thereto. At the point that a monomer conversion was about 90%, 145 g of methyl methacrylate (MMA), 14.5 g of styrene and 160 g of ethyl acetate, in which oxygen was removed in advance, were introduced, and the nitrogen bubbling was additionally performed for 40 minutes to remove oxygen. When the temperature of the reactant reached 65° C., a solution containing 0.036 g of $CuBr_2$ and 0.092 g of TPMA (tris(2-pyridylmethyl)amine) dissolved in 1.0 mL of deoxygenated DMF (N,N-dimethylformamide) was introduced thereto and 0.6 g of a solution containing 5 wt % of azobisisobutyronitrile (AIBN) as a catalyst reducing agent and ethyl acetate as a solvent was introduced thereto to perform a chain extension reaction. When the conversion reached 80%, all the reaction mixture was transferred to a 3 L polymerization reactor through a pump. 1300 g of butyl acrylate, 13.1 g of 4-hydroxybutyl acrylate (4-HBA) and 1000 g of ethyl acetate were charged into the 3 L polymerization reactor and nitrogen was bubbled for about 60 minutes to remove oxygen. A catalyst solution prepared by mixing 0.035 g of $CuBr_2$, 0.090 g of TPMA (tris(2-pyridylmethyl)amine) and 5 mL of DMF (N,N-dimethylformamide), in a condition that the reaction temperature was maintained at 65° C. under a nitrogen atmosphere, was introduced thereto and 3.3 g of the solution containing 5 wt % of azobisisobutyronitrile (AIBN) and ethyl acetate as a solvent was introduced thereto to initiate the chain extension reaction. At the point that the reaction conversion reached about 80%, the reaction was terminated to produce a block copolymer solution having a molecular weight (Mn) of 250,000 and a molecular weight distribution (Mw/Mn) of 2.88. Here, the weight ratio of the first block and the second block is 15:85 or so.

Preparation Example 3. Preparation of Pentablock Copolymer (A3)

19.5 g of polyethylene glycol bis(2-bromoisobutyrate) (number average molecular weight, Mn, 10,000), 150 g of methyl methacrylate (MMA) and 170 g of ethyl acetate were placed in a 500 mL round-bottom flask, and the nitrogen bubbling was performed for 40 minutes to remove oxygen. The flask was placed in an oil bath heated to 65° C., and when the temperature of the reactant reached 65° C., a solution, in which 0.033 g of $CuBr_2$ and 0.085 g of TPMA (tris(2-pyridylmethyl)amine) were dissolved in 1.5 mL of deoxygenated DMF (N,N-dimethylformamide) was introduced thereto and 5.3 g of a solution containing 5 wt % of azobisisobutyronitrile (AIBN) and ethyl acetate as a solvent was introduced thereto to perform a chain extension reaction. When the conversion reached 80%, all the reaction mixture was transferred to a 3 L polymerization reactor through a pump. 1320 g of butyl acrylate (BA), 13.3 g of 4-hydroxybutyl acrylate (4-HBA) and 1000 g of ethyl acetate were charged into the 3 L polymerization reactor and nitrogen was bubbled for about 60 minutes to remove oxygen. A catalyst solution prepared by mixing 0.039 g of $CuBr_2$, 0.10 g of TPMA (tris(2-pyridylmethyl)amine) and 5 mL of DMF (N,N-dimethylformamide), in a condition that the reaction temperature was maintained at 65° C. under a nitrogen atmosphere, was introduced thereto and 3.3 g of the solution containing 5 wt % of azobisisobutyronitrile (AIBN) and ethyl acetate as a solvent was introduced thereto to initiate the chain extension reaction. At the point that the reaction conversion reached about 85%, the reaction was terminated to produce a block copolymer solution having a molecular weight (Mn) of 240,000 and a molecular weight distribution (Mw/Mn) of 3.15. Here, the weight ratio of the first block and the second block is 13:87 or so.

Preparation Example 4. Preparation of Pentablock Copolymer (A4)

0.33 g of ethylene glycol di-alphabromoisobutyrate, 22.9 g of 3-ethylhexyl acrylate (2-EHA) and 25 g of ethyl acetate were placed in a 500 mL round-bottom flask and sealed, and then the nitrogen bubbling was performed for about 40 minutes to remove oxygen. After removing oxygen, the flask was placed in an oil bath heated to 65° C. and a solution, in which 0.003 g of $CuBr_2$ and 0.007 g of TPMA (tris(2-pyridylmethyl)amine) were dissolved in 0.2 mL of deoxygenated DMF (N,N-dimethylformamide) was introduced into the flask. Subsequently, the reaction was initiated by introducing 0.40 g of a 5% EA solution of azobisisobutyronitrile (AIBN) as a catalyst reducing agent thereto. At the point that a monomer conversion was about 90%, 130 g of methyl methacrylate (MMA) and 160 g of ethyl acetate, in which oxygen was removed in advance, were introduced, and the nitrogen bubbling was additionally performed for 40 minutes to remove oxygen. When the temperature of the reactant reached 65° C., a solution, in which 0.029 g of $CuBr_2$ and 0.075 g of TPMA (tris(2-pyridylmethyl)amine) were dissolved in 1.0 mL of DMF (N,N-dimethylformamide) removing oxygen, was introduced thereto and 4.6 g of a solution containing 5 wt % of azobisisobutyronitrile (AIBN) and ethyl acetate as a solvent was introduced thereto to perform a chain extension reaction. When the conversion reached 80%, all the reaction mixture was transferred to a 3 L polymerization reactor through a pump. 1185 g of butyl acrylate (BA), 12.0 g of 4-hydroxybutyl acrylate (4-HBA) and 1000 g of ethyl acetate were charged into the 3 L polymerization reactor and nitrogen was bubbled for about 60 minutes to remove oxygen. A catalyst solution prepared by mixing 0.036 g of $CuBr_2$, 0.093 g of TPMA (tris(2-pyridylmethyl)amine) and 5 mL of DMF (N,N-dimethylformamide), in a condition that the reaction temperature was maintained at 65° C. under a nitrogen atmosphere, was introduced thereto and 3.0 g of the solution containing 5 wt % of azobisisobutyronitrile (AIBN) and ethyl acetate as a solvent was introduced thereto to initiate the chain extension reaction. At the point that the reaction conversion reached about 70%, the reaction was terminated to produce a block copolymer solution having a molecular weight (Mn) of 220,000 and a molecular weight distribution (Mw/Mn) of 2.85. Here, the weight ratio of the first block and the second block is 15:85 or so.

The compositions and physical properties of the block copolymers prepared in Preparation Examples 1 to 4 are summarized in the following table.

TABLE 1

|  |  |  | Preparation Example 1 A1 | Preparation Example 2 A2 | Preparation Example 3 A3 | Preparation Example 4 A4 |
|---|---|---|---|---|---|---|
| Block copolymer | First block (A-B-A) | Composition of A block | MMA | MMA + St | MMA | MMA |
|  |  | Composition of B Block | BA | BA | PEG | EHA |
|  |  | Tg of A block | 105° C. | 103° C. | 105° C. | 105° C. |
|  |  | Tg of B block | −54° C. | −54° C. | −85° C. | −50° C. |
|  |  | Tg of the first block | 77° C. | 62° C. | 59° C. | 58° C. |
|  |  | A:B weight ratio | 11:89 | 18:82 | 14:86 | 17:83 |
|  |  | Mn | 85000 | 70000 | 76000 | 65000 |
|  |  | Dispersity (Mw/Mn) | 1.32 | 1.75 | 1.58 | 1.62 |
|  | Second block | Composition | BA + HBA | BA + HBA | BA + HBA | BA + HBA |
|  |  | Tg | −54° C. | −54° C. | −54° C. | −54° C. |
|  | First block second block weight ratio |  | 14:86 | 15:85 | 13:87 | 15:85 |
|  |  | Mn | 350000 | 250000 | 240000 | 220000 |
|  | Dispersity (Mw/Mn) |  | 1.84 | 2.88 | 3.15 | 2.85 |

MMA: methyl methacrylate
St: styrene
BA: butyl acrylate
PEG: polyethylene glycol
EHA: 2-ethylhexyl acrylate
HBA: 4-hydroxbutyl acrylate

Comparative Preparation Example 1. Preparation of Triblock Copolymer (B1)

0.26 g of ethylene glycol di-alphabromoisobutyrate, 190 g of methyl methacrylate (MMA) and 190 g of ethyl acetate were introduced, and the nitrogen bubbling was performed for 40 minutes to remove oxygen. When the temperature of the reactant reached 65° C., a solution, in which 0.036 g of $CuBr_2$ and 0.092 g of TPMA (tris(2-pyridylmethyl)amine) were dissolved in 1.5 mL of deoxygenated DMF (N,N-dimethylformamide) was introduced thereto and 6 g of a solution containing 5 wt % of azobisisobutyronitrile (AIBN) and ethyl acetate as a solvent was introduced thereto to perform a chain extension reaction. When the conversion reached 80%, all the reaction mixture was transferred to a 3 L polymerization reactor through a pump. 1300 g of butyl acrylate (BA), 13.1 g of 4-hydroxybutyl acrylate (4-HBA) and 1000 g of ethyl acetate were charged into the 3 L polymerization reactor and nitrogen was bubbled for about 60 minutes to remove oxygen. A catalyst solution prepared by mixing 0.035 g of $CuBr_2$, 0.090 g of TPMA (tris(2-pyridylmethyl)amine) and 5 mL of DMF (N,N-dimethylformamide), in a condition that the reaction temperature was maintained at 65° C. under a nitrogen atmosphere, was introduced thereto and 3.3 g of the solution containing 5 wt % of azobisisobutyronitrile (AIBN) and ethyl acetate as a solvent was introduced thereto to initiate the chain extension reaction. At the point that the reaction conversion reached about 80%, the reaction was terminated to produce a block copolymer solution having a molecular weight (Mn) of 240,000 and a molecular weight distribution (Mw/Mn) of 2.84. Here, the weight ratio of the first block and the second block is 15:85 or so.

Comparative Preparation Example 2. Preparation of Diblock Copolymer (B2)

0.28 g of ethyl alphabromoisobutyrate, 190 g of methyl methacrylate (MMA) and 190 g of ethyl acetate were introduced, and the nitrogen bubbling was performed for 40 minutes to remove oxygen. When the temperature of the reactant reached 65° C., a solution, in which 0.036 g of $CuBr_2$ and 0.092 g of TPMA (tris(2-pyridylmethyl)amine) were dissolved in 1.5 mL of deoxygenated DMF (N,N-dimethylformamide) was introduced thereto and 6 g of a solution containing 5 wt % of azobisisobutyronitrile (AIBN) and ethyl acetate as a solvent was introduced thereto to perform a chain extension reaction. When the conversion reached 80%, all the reaction mixture was transferred to a 3 L polymerization reactor through a pump. 1300 g of butyl acrylate (BA), 13.1 g of 4-hydroxybutyl acrylate (4-HBA) and 1000 g of ethyl acetate were charged into the 3 L polymerization reactor and nitrogen was bubbled for about 60 minutes to remove oxygen. A catalyst solution prepared by mixing 0.035 g of $CuBr_2$, 0.090 g of TPMA (tris(2-pyridylmethyl)amine) and 5 mL of DMF (N,N-dimethylformamide), in a condition that the reaction temperature was maintained at 65° C. under a nitrogen atmosphere, was introduced thereto and 3.3 g of the solution containing 5 wt % of azobisisobutyronitrile (AIBN) and ethyl acetate as a solvent was introduced thereto to initiate the chain extension reaction. At the point that the reaction conversion reached about 80%, the reaction was terminated to produce a block copolymer solution having a molecular weight (Mn) of 260,000 and a molecular weight distribution (Mw/Mn) of 2.87. Here, the weight ratio of the first block and the second block is 15:85 or so.

Comparative Preparation Example 3. Preparation of Random Copolymer (B3)

The random copolymer B3 into which only chemical cross-linking was introduced was prepared as follows. 200 g of butyl acrylate (BA), 2.0 g of 4-hydroxybutyl acrylate (4-HBA) and 600 g of ethyl acetate were charged into a flask and then nitrogen was bubbled for 60 minutes to remove dissolved oxygen. When the reaction temperature reached 65° C., a 2 wt % ethyl acetate solution containing 0.10 g of azobisisobutyronitrile (AIBN) was introduced to initiate the reaction. When the reaction conversion ratio reached about 70%, the reaction was terminated to obtain a random copolymer having a molecular weight (Mn) of 220,000 and a molecular weight distribution of 4.52.

Example 1

To 100 parts by weight of the pentablock copolymer (A1) prepared in Preparation Example 1, about 0.2 parts by weight of a cross-linking agent (TDI-TMPTA adduct, toluene diisocyanate-trimethylolpropane adduct) and about 0.02 parts by weight of a known cross-linking catalyst were blended to prepare a polymer composition. Subsequently, the composition was coated on a release-treated PET (poly (ethylene terephthalate)) film to a thickness of about 25 μm and dried at 120° C. for about 3 minutes. Subsequently, the dried layer thus formed was transferred to one side of a known polarizing plate to produce a pressure-sensitive adhesive applied polarizing plate.

Examples 2 to 4

A pressure-sensitive adhesive polarizing plate was prepared in the same manner as in Example 1, except that the pentablock copolymers (A2, A3, A4) prepared in Preparation Examples 2 to 4 were used.

Comparative Examples 1 to 3

A pressure-sensitive adhesive polarizing plate was produced in the same manner as in Example 1, except that the block copolymers (B1, B2) and the random copolymer prepared in Comparative Preparation Examples 1 to 3 were used.

The results of evaluating the physical properties of the polymer compositions of Examples and Comparative Examples, and the like were summarized and described in Table 2 below.

TABLE 2

|  | Example | | | | Comparative Example | | |
| --- | --- | --- | --- | --- | --- | --- | --- |
|  | A1 | A2 | A3 | A4 | B1 | B2 | B3 (reference specimen) |
| Polymer structure | pentablock | pentablock | pentablock | pentablock | triblock | diblock | random |
| High temperature endurance characteristics | A | A | A | A | A | A | B |
| Relative bending fraction (%) | 71 | 69 | 66 | 66 | 92 | 87 | 100 |

From the results of Table 2, in the case of using the block copolymer having the physically cross-linked structure added to the chemically cross-linked structure, excellent durability at high temperature conditions could be obtained over the random copolymer only capable of forming the chemical cross-linking. In particular, it could be confirmed that in the case of using the pentablock copolymer, it exhibits excellent bending suppression property by action as the stress relaxation points residing inside the physically cross-linking points over the case of using the triblock or diblock copolymer.

EXPLANATION OF REFERENCE NUMERALS

10: pressure-sensitive adhesive polarizing plate
100: optical film
110: primer layer
120: pressure-sensitive adhesive layer

The invention claimed is:

1. A polymer composition comprising a block copolymer comprising a first block having a glass transition temperature of 20° C. or higher and being in a form of a triblock copolymer, and a second block having a glass transition temperature of 10° C. or lower,
   wherein the second block comprises a cross-linkable functional group,
   wherein the first block comprises A blocks having a glass transition temperature of 30° C. or higher and a B block having a glass transition temperature of 0° C. or lower,
   wherein the A blocks are bonded to both ends of the B block, respectively, and
   wherein the second block is bonded to the ends of the A blocks.

2. The polymer composition according to claim 1, wherein each of the A blocks comprises, as a main component, a polymerized unit derived from at least one selected from the group consisting of alkyl methacrylate, acrylamide, N-alkyl acrylamide, styrene, a styrene derivative, maleimide and acrylonitrile.

3. The polymer composition according to claim 1, wherein the B block comprises, as a main component, a polymerized unit derived from at least one selected from the group consisting of alkyl acrylate, an olefin compound, a diene compound and an alkylene oxide.

4. The polymer composition according to claim 1, wherein the A blocks have a weight ratio in a range of 50 to 95 wt % based on the total weight of the A and B blocks.

5. The polymer composition according to claim 1, wherein the first block has a number average molecular weight in a range of from 15,000 to 150,000.

6. The polymer composition according to claim 1, wherein the first block has a polydispersity index (Mw/Mn) in a range of 1.01 to 3.

7. The polymer composition according to claim 1, wherein the second block comprises, as a main component, a polymerized unit derived from alkyl acrylate.

8. The polymer composition according to claim 1, wherein the second block further comprises a polymerized unit derived from 0.1 to 5 parts by weight of a cross-linkable monomer relative to 100 parts by weight of alkyl acrylate.

9. The polymer composition according to claim 1, wherein the second block has a weight ratio in a range of 65 to 95 wt % based on the total weight of the first and second blocks.

10. The polymer composition according to claim 1, wherein the block copolymer has a number average molecular weight (Mn) in a range of 100,000 to 800,000.

11. The polymer composition according to claim 1, wherein the block copolymer has a polydispersity index (Mw/Mn) of 5 or less.

12. The polymer composition according to claim 1, wherein the block copolymer forms a phase separated structure.

13. The polymer composition according to claim 12, wherein the phase separated structure is a spherical structure.

14. The polymer composition according to claim 1, further comprising a multifunctional cross-linking agent having a functional group reactive with the cross-linkable functional group.

15. The polymer composition according to claim 1, wherein the first block does not comprise a cross-linkable functional group.

16. An optical laminate comprising an optical film; and a pressure-sensitive adhesive layer formed on one side of said optical film, wherein said pressure-sensitive adhesive layer comprises a cross-linked product of the polymer composition of claim 1.

17. A pressure-sensitive adhesive optical film in which a pressure-sensitive adhesive layer is provided on an optical film through a primer layer, characterized in that the pressure-sensitive adhesive layer is formed by a pressure-sensitive adhesive containing the polymer composition according to claim 1.

18. A display device comprising the optical laminate of claim 16.

* * * * *